US006975063B2

(12) United States Patent
Mao et al.

(10) Patent No.: US 6,975,063 B2
(45) Date of Patent: Dec. 13, 2005

(54) METALLIZATION OF CARBON NANOTUBES FOR FIELD EMISSION APPLICATIONS

(75) Inventors: Dongsheng Mao, Austin, TX (US); Zvi Yaniv, Austin, TX (US); Richard Lee Fink, Austin, TX (US)

(73) Assignee: SI Diamond Technology, Inc., Austin, TX (US)

( * ) Notice: Subject to any disclaimer, the term of this patent is extended or adjusted under 35 U.S.C. 154(b) by 169 days.

(21) Appl. No.: 10/406,928

(22) Filed: Apr. 4, 2003

(65) Prior Publication Data

US 2004/0013597 A1 Jan. 22, 2004

Related U.S. Application Data

(63) Continuation-in-part of application No. 10/372,006, filed on Feb. 21, 2003, now abandoned.

(60) Provisional application No. 60/417,246, filed on Oct. 9, 2002, provisional application No. 60/372,067, filed on Apr. 12, 2002.

(51) Int. Cl.[7] .......................... H01J 1/304; H01J 1/30; H01J 9/02
(52) U.S. Cl. .................... 313/309; 313/351; 313/311; 445/50; 445/51
(58) Field of Search .................. 313/309, 310, 313/311, 351, 346 R, 495; 445/49, 50, 15

(56) References Cited

U.S. PATENT DOCUMENTS 6,019,656 A 2/2000 Park et al.
6,250,984 B1 * 6/2001 Jin et al. ...................... 445/51
6,312,303 B1 11/2001 Yaniv et al. .................. 445/24
6,383,923 B1 5/2002 Brown et al.
6,436,221 B1 8/2002 Chang et al. ............... 156/247
6,504,292 B1 1/2003 Choi et al. .................. 313/310
6,630,772 B1 * 10/2003 Bower et al. ............... 313/309
6,664,727 B2 12/2003 Nakamoto
6,741,019 B1 * 5/2004 Filas et al. .................. 313/309

FOREIGN PATENT DOCUMENTS

EP    1 061 042 A1    12/2000
JP    2000233911 A *  8/2000    ........... C01B 31/02

OTHER PUBLICATIONS

Serge Palacin et al., "Patterning with Magnetic Materials at the Micron Scale," *Chem. Mater.*, vol. 8, No. 6, 1996, pp. 1316-1325.

Jean-Marc Bonard et al., "Tuning the Field Emission Properties of Patterned Carbon Nanotube Films," *Adv. Mater.*, 2001, vol. 13, No. 3, Feb. 5, pp. 184-188.

Patricia Berger et al., "Preparation and Properties of an Aqueous Ferrofluid," *Journal of Chemical Education*, vol. 76, No. 7, Jul. 1999, pp. 943-948.

(Continued)

*Primary Examiner*—Mariceli Santiago
(74) *Attorney, Agent, or Firm*—Edward Mickelson; Winstead Sechrest & Minick P.C.

(57) ABSTRACT

The present invention is directed towards metallized carbon nanotubes, methods for making metallized carbon nanotubes using an electroless plating technique, methods for dispensing metallized carbon nanotubes onto a substrate, and methods for aligning magnetically-active metallized carbon nanotubes. The present invention is also directed towards cold cathode field emitting materials comprising metallized carbon nanotubes, and methods of using metallized carbon nanotubes as cold cathode field emitters.

13 Claims, 8 Drawing Sheets

OTHER PUBLICATIONS

Jaemyung Kim et al., "Growth and field emission of carbon nanotubes on electroplated Ni catalyst coated on glass substrates," *Journal of Applied Physics*, vol. 90, No. 5, Sep. 1, 2001, pp. 2591-2594.

J.H. You et al., "Toward a Ridge of Carbon Nanotube FEDs," International Display Workshop, Nagoya, Japan Oct. 16-19, 2001, pp. 1221-1224.

Hiroyuki Kurachi et al., "FED with Double-walled Carbon Nanotube Emitters," International Display Workshop, Nagoya, Japan, Oct. 16-19, 2001, pp. 1237-1240.

Jong Min Kim et al., "Field Emission from Carbon Nanotubes for Displays," *Diamond and Related Materials*, vol. 9, 2000, pp. 1184-1189.

* cited by examiner

METALLIZATION OF CARBON NANOTUBES FOR FIELD EMISSION APPLICATIONS

CROSS REFERENCE TO RELATED APPLICATIONS

The present application is a Continuation-In-Part of U.S. patent application Ser. No. 10/372,006 filed Feb. 21, 2003 now abandoned and which claims priority to U.S. Provisional Patent Application No. 60/417,246 filed Oct. 9, 2002. The present application claims priority to the following U.S. Provisional Patent Applications: Ser. No. 60/372,067 filed Apr. 12, 2002; Ser. No. 60/417,246 filed Oct. 9, 2002.

TECHNICAL FIELD

The present invention relates in general to nanostructured materials, and in particular, to using modified carbon nanotubes for field emission applications.

BACKGROUND INFORMATION

Carbon nanotubes (CNTs) are currently being investigated for use as cold electron sources in a variety of applications. These include displays, microwave sources, x-ray tubes, etc. For CNTs to be used as a cold cathode, they must be placed on a conductive surface (conductive substrate or conductive film on a non-conductive substrate). This has led some to place catalysts on the substrate surface and grow the carbon nanotubes in situ using CVD techniques (Kim et al., *J. Appl. Phys.*, 90(5), 2591 (2001)). However, this has several draw-backs. This technique typically grows multi-wall carbon nanotubes (MWNTs). However, MWNTs have poorer field emission quality compared to single-wall carbon nanotubes (SWNTs) (Kurachi et al., "FED with double-walled carbon nanotube emitters," the 21$^{st}$ International Display Research Conference in Conjunction with the 8$^{th}$ International Display Workshops, Nagoya Congress Center, Nagoya, Japan, Oct. 16–19, 2001, pp. 1237–1240). The substrate is subjected to high temperature, typically above 600° C., limiting the substrates that can be used. Uniformity is difficult to achieve because of the high temperature growth processes required. As a result, the manufacture of cathodes using this process will be very expensive due to the number and complexity of post-processing steps needed to generate a material capable of producing the desired level of field emission.

Other investigations have centered on processes for making CNT cathodes in a separate process, collecting them, and then dispensing them onto a substrate using a variety of techniques (Kim et al., *Diamond and Related Materials*, 9, 1184 (2000)). This has several advantages over the in situ method described above. First, the fabrication of the CNT material is decoupled from the fabrication of the cathode. This permits choosing the optimal CNT material for the application (single-wall, double-wall, multi-wall, purified, non-purified, etc.). Second, the dispensing process is carried out a relatively low-temperatures, permitting greater flexibility in the choice of substrates. Third, uniform deposition over large area substrates is far more feasible using currently-available, low-cost equipment. Current dispensing processes, however, have their disadvantages. One of these is that the CNT fibers are often dispensed such that they clump together or are imbedded inside another material (Kim et al., "Toward a ridge of carbon nanotube FEDs," the 21$^{st}$ International Display Research Conference in Conjunction with the 8$^{th}$ International Display Workshops, Nagoya Congress Center, Nagoya, Japan, Oct. 16–19, 2001, pp. 1221–1224). These factors limit the performance of the CNT material. "Activation" processes are often employed after dispensing the CNT material. These processes recover some of the performance of the virgin CNT (Chang et al., U.S. Pat. No. 6,436,221 B1). These "activation" process steps, however, can add cost to the product and may lead to non-uniform performance. Yet another disadvantage of current dispensing techniques is that the dispensed CNT fibers may not have sufficiently good contact to the substrate or the substrate's conductive layer such that this impedes their ability to supply the electrons needed for field emission.

It has been recently found that by mixing CNT material with other nanoparticle materials, the field emission properties of the CNT were improved (Mao et al., U.S. Provisional Application No. 60/417,246, incorporated herein by reference). Because neighboring nanotubes shield the extracted electric fields from each other (Bonard et al., *Adv. Mat.*, 13, 184 (2001)), it is believed that this improvement is a result of induced separation of the CNT material by the nanoparticles. In situations where the CNT fibers are too close, they may electrically screen the applied electric field from each other. By increasing the separation between the fibers, the effective applied field strength at the emission sites is higher.

Many SWNT fibers are semiconducting with a bandgap that is dependent upon the chiral indices (n,m) of the SWNT. Choi et al. (U.S. Pat. No. 6,504,292 B1) teach that, for field emission applications, this bandgap can be overcome by depositing a metal film on CNT fibers that are already attached to a substrate. Choi et al. teach that the CNT fibers are coated after the fibers are grown using CVD techniques. This method has the inherent aforementioned disadvantages of growing CNTs on the substrate. Furthermore, were the CNT fibers to be dispensed onto the substrate and then coated, the problems of separating the CNT fibers for improved emission would still remain.

A method of aligning CNTs is disclosed in U.S. Pat. No. 6,312,303 B1 to Yaniv et al. (incorporated herein by reference), whereby CNTs are aligned by including the CNTs in a host material, aligning the host material (such as liquid crystal material) and the host phase material then aligns the CNTs.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention is directed towards metallized carbon nanotubes, methods for making metallized carbon nanotubes; methods for dispensing metallized carbon nanotubes onto a substrate; methods for aligning metallized carbon nanotubes; cold cathode field emitting materials comprising metallized carbon nanotubes, aligned metallized carbon nanotubes, and combinations thereof; and methods of using metallized carbon nanotubes as cold cathode field emitters.

Metallized carbon nanotubes, according to the present invention, are carbon nanotubes which have been at least partially coated with one or more metals. Carbon nanotubes, according to the present invention, include, but are not limited to, single-wall carbon nanotubes, multi-wall carbon nanotubes, double-wall carbon nanotubes, buckytubes, carbon fibrils, derivatized carbon nanotubes, chemically-modified carbon nanotubes, metallic carbon nanotubes, semiconducting carbon nanotubes, and combinations thereof. Purity of the carbon nanotube reactant materials (i.e., the carbon nanotubes prior to being metallized) ranges generally from at least about 1 percent to at most about 100 percent, specifically from at least about 10 percent to at most about 100 percent, and more specifically from at least about 20 percent to at most about 100 percent. Carbon nanotubes, as described herein, can exist in bundles or as individual entities. Furthermore, the carbon nanotubes from which the metallized carbon nanotubes are derived can be produced by any process which suitably provides for carbon nanotubes according to the present invention.

Figure 1:
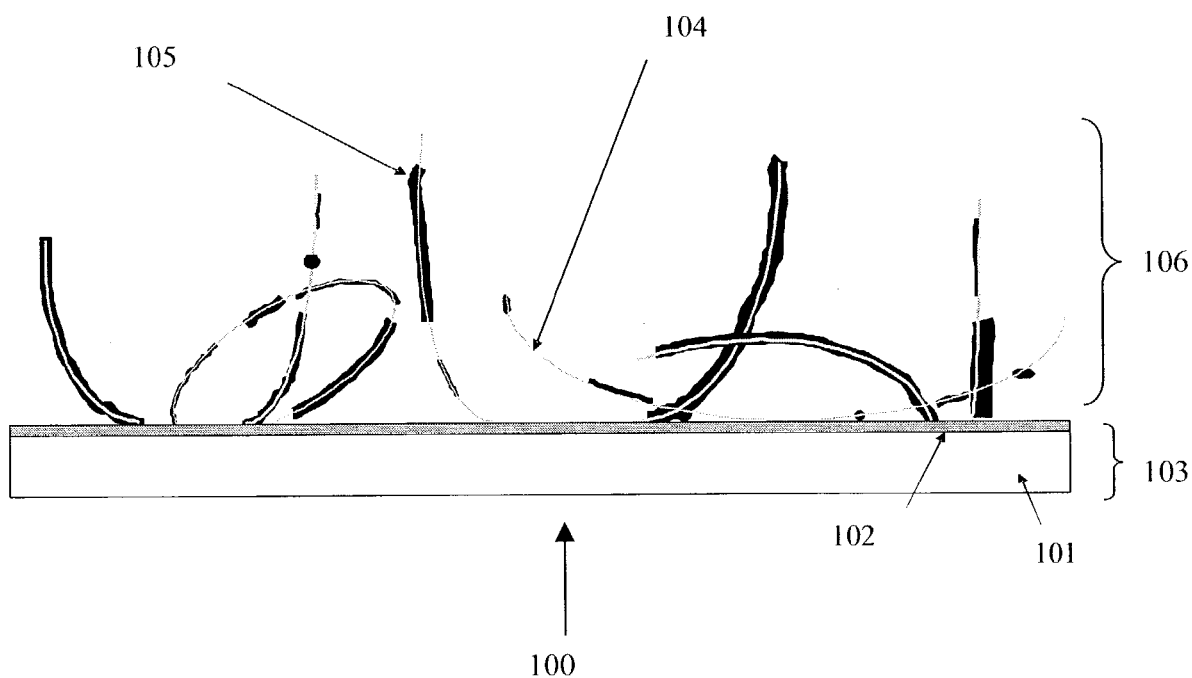
FIG. 1 illustrates metallized carbon nanotubes on indium-tin-oxide (ITO)/glass, wherein the metal coating is not necessarily uniform over all of the carbon nanotubes (CNTs)

Metal coatings (also termed "films") on the carbon nanotubes comprise one or more metal layers and range generally in thickness from at least about 0.1 nanometer (nm) to at most about 10 micrometers ($\mu$m), specifically from at least about 0.1 nanometer to at most about 1 micrometer, and more specifically from at least about 0.5 nanometers to at most about 1 micrometer. Metal coatings on the carbon nanotubes include, but are not limited to nickel (Ni), iron (Fe), copper (Cu), silver (Ag), zinc (Zn), rhodium (Rh), tin (Sn), cadmium (Cd), chromium (Cr), beryllium (Be), palladium (Pd), indium (In), platinum (Pt), gold (Au), and combinations thereof. In some embodiments, the metal coating comprises an alloy of two or more metals. In some embodiments, the metal coating comprises multiple layers of differing metals or alloys. In some embodiments, the metal coating comprises metals which are magnetically-active in that they exhibit an affinity for aligning along magnetic field lines when placed in a magnetic field. The weight percent of metal in the metallized carbon nanotube product ranges generally from at least about 0.1 percent to at most about 99 percent, specifically from at least about 1 percent to at most about 99 percent, and more specifically from at least about 5 percent to at most about 99 percent. In some embodiments of the present invention, these metal coatings are highly uniform over individual carbon nanotubes. In some embodiments, these metal coatings are non-uniform, non-continuous, and/or incomplete, as depicted in FIG. 1 wherein metal coating 105 is shown on carbon nanotubes 104 to form metallized carbon nanotubes 106. In some embodiments these metal coatings are deposited primarily on the exterior of carbon nanotube bundles. In some embodiments, bundles of carbon nanotubes are metallized within the interior of the bundle. In some embodiments, the carbon nanotubes are metallized endohedrally, inside the tube structure. Some embodiments comprise metallized carbon nanotubes with any combination(s) of the aforementioned metallized carbon nanotubes.

Exemplary methods of making metallized carbon nanotubes comprise the steps of: a) providing a plurality of carbon nanotubes; b) preparing an electroless metal plating solution; c) adding said carbon nanotubes to said electroless metal plating solution to form a reaction solution; d) subjecting said reaction solution to a reducing condition which causes metal ions in solution to be reduced to metal and nucleate on the carbon nanotubes to produce metallized carbon nanotubes; and e) removing said metallized carbon nanotubes from the reaction solution. In some embodiments of the present invention, the metallized carbon nanotubes are washed and dried after being removed from the reaction solution.

Carbon nanotubes, as described herein, can be carbon nanotubes of any dimension, chirality, and number of walls that suitably provides for carbon nanotubes of the present invention and include, but are not limited to, single-wall carbon nanotubes (SWNTs), multi-wall carbon nanotubes (MWNTs), double-wall carbon nanotubes (DWCTs), buckytubes, carbon fibrils, derivatized carbon nanotubes, chemically-modified carbon nanotubes, metallic carbon nanotubes, semiconducting carbon nanotubes, and combinations thereof. In some embodiments of the present invention, the carbon nanotubes are treated with hydrochloric acid prior to the metallization step.

An electroless plating solution (commonly referred to as a plating bath), according to the present invention, comprises a solvent, a metal salt, and a reducing agent (See Ranney et al., Electroless Plating and Coating of Metals, "Noyes, Park Ridge, N.J. (1972), incorporated herein by reference, for a detailed description of electroless plating techniques). In some embodiments of the present invention, there is a promoter species which helps to dissolve the metal salt. In some embodiments, there may be a balancing agent to control the pH. The solvent can be any solvent which suitably provides for the solvation of the electroless plating solution components. An exemplary solvent is water. The metal salt can be any metal salt that suitably provides for electroless metal plating according to the present invention and includes, but is not limited to, salts of the following: nickel, iron, copper, silver, zinc, rhodium, tin, cadmium, chromium, beryllium, palladium, indium, platinum, gold, and combinations thereof. In some embodiments, alloys of two or more metals are plated on the carbon nanotubes with this process. The reducing agent can be any reducing agent that suitably provides for the reduction of the metal salt according to the present invention and includes, but is not limited to $NaH_2PO_2 \cdot H_2O$, $N_2H_4 \cdot 2HCl$, $N_2H_4 \cdot xH_2O$, and combinations thereof. The optional promoter species can be any species which suitably promotes the electroless metal plating process of the present invention by facilitating the dissolution of the metal salt in the solution. Suitable promoter species include, but are not limited to $C_4H_4O_6KNa \cdot 4H_2O$, $Na_2C_4H_4O_6$, $Na_3C_6H_5O_7 \cdot 2H_2O$, and combinations thereof. The optional balancing agent can be any species which suitably provides for the control of pH according to the present invention. Suitable balancing agents include, but are not limited to NaOH, KOH, $NH_4OH$, and combinations thereof.

In some embodiments of the present invention, the process of adding the carbon nanotubes to the electroless plating solution is carried out by first ultrasonicating the carbon nanotubes in a suitable solvent just prior to addition. This enhances their dispersal in the electroless plating solution to form a reaction solution. This reaction solution is subjected to a reducing condition which causes metal ions in solution to be reduced to metal and nucleate on the carbon nanotubes to produce metallized carbon nanotubes. Reducing conditions, according to the present invention, are any conditions which suitably provide for a reduction of the metal ions in solution. Such reducing conditions induce this reduction and include, but are not limited to, heating, irradiation, chemical activation, and combinations thereof. In some embodiments, the electroless plating solution is subjected to the reducing condition prior to the addition of the carbon nanotubes.

In some embodiments of the present invention, the degree of carbon nanotube metallation (i.e., the amount of metal coated on the carbon nanotubes) is modulated by the amount of carbon nanotubes present in the reaction solution. In other embodiments, the degree of carbon nanotube metallation is modulated by the concentration of metal salts and reducing agents present in the reaction solution. In other embodiments, the degree of carbon nanotube metallation is modulated by the time the carbon nanotubes spend in the reaction solution. In still other embodiments, a combination of one or more of the aforementioned methods of modulating the degree of carbon nanotube metallation is used to produce a metallized carbon nanotube product with certain desired characteristics dependent upon the degree in which is has been metallized.

In some embodiments of the present invention, prior to the step of removing the metallized carbon nanotubes from the reaction solution, a stabilizing agent is added to slow the reduction of the metal ions. A stabilizing agent can be any species which suitably provides for the slowing of the reduction process of the present invention and includes, but is not limited to, $H_3BO_3$, $C_3H_6O_3$, and combinations thereof. Such slowing of the reaction facilitates greater control over the nature of the end product. Suitable methods of removing the metallized carbon nanotubes from the reaction solution include, but are not limited to, centrifugation (and subsequent decantation), filtration, and combinations thereof. In some embodiments of the present invention, after the step of removing the metallized carbon nanotubes from the reaction solution, there is a step of washing the metallized carbon nanotube product. Suitable washing solvents include any solvent which suitably removes unwanted reactants or reaction products from the final product. Suitable solvents include, but are not limited to, water, isopropyl alcohol, acetone, and combinations thereof Optional drying of the metallized carbon nanotube product can be carried out by any drying process which suitably provides for the drying of the metallized carbon nanotubes according to the present invention and includes, but is not limited to, heating, exposure to vacuum, vacuum heating, irradiation, and combinations thereof.

Exemplary methods of dispensing metallized carbon nanotubes onto a substrate comprise: a) dispersing the metallized carbon nanotubes in a solvent to form a suspension; and b) applying the suspension to a substrate using an "applicator means." Solvents into which the metallized carbon nanotubes are dispersed include, but are not limited to, isopropanol, methanol, acetone, water, ethanol, and combinations thereof. Methods of dispersing the metallized carbon nanotubes in the solvent include, but are not limited to, stirring, shaking, ultrasonic assistance, and combinations thereof. FIG. 1 illustrates one embodiment of metallized carbon nanotubes 106 on a substrate 103.

An applicator means, according to the present invention, can be any method which suitably dispenses the suspension of metallized carbon nanotubes onto a substrate in a controlled manner. Such application can be uniform or non-uniform, and can vary considerably in terms of the thickness of the resulting film, or layer, of metallized carbon nanotubes on the substrate. Suitable applicator means include, but are not limited to, printing, dispensing, painting, spaying, brushing, and combinations thereof. Suitable printing methods include, but are not limited to, inkjet printing, screen printing, off-set printing, and combinations thereof. An exemplary applicator means comprises a spraying technique whereby the suspension of metallized carbon nanotubes is sprayed onto a surface using a sprayer. While not intending to be bound by theory, a sprayer, according to the present invention, can be a pump sprayer which rapidly pushes the suspension through a small orifice and, upon exiting said orifice, the suspension becomes an aerosol of small suspension droplets which are directed toward the substrate surface. Optionally, the substrate can be heated during the application process to prevent the running of excess solvent. Typically, the substrate, after having applied the metallized carbon nanotubes to its surface, is dried to remove any excess solvent. A substrate, as described herein, can be any substrate which suitably provides for a surface on which to dispense metallized carbon nanotubes according to the present invention and includes, but is not limited to, metals, ceramics, glass, semiconductors, coated surfaces, layered materials, and combinations thereof.

In some embodiments of the present invention, the metallized carbon nanotubes are dispensed onto a substrate while under the influence of a magnetic field. In embodiments such as these, and when the metallized carbon nanotubes have a magnetically-active coating, the metallized carbon nanotubes can be aligned or oriented in a desired manner. In some embodiments of the present invention, the metallized carbon nanotubes are magnetically-aligned subsequent to their being dispensed on a substrate. Magnetic alignment, according to the present invention, can be achieved with one or more magnets selected from the group consisting of permanent magnets, electromagnets, and combinations thereof. Various embodiments of the present invention comprise magnetic fields which include, but are not limited to, magnetic fields which are uniform, non-uniform, directed, multidirectional, isotropic, anisotropic, continuous, pulsed, and combinations thereof. In some embodiments, a magnetic field is applied to an entire substrate while a dispensing head is rastered over the substrate surface. In some embodiments, the magnetic field is highly localized and is itself rastered along with a dispensing head over the substrate surface. In some embodiments of the present invention, the substrate is magnetic. Magnetic alignment, according to the present invention, is a very clean process in that, unlike existing alignment processes (Chang et al., U.S. Pat. No. 6,436,221), nothing is required to come into contact with the nanotube surface in order to generate such alignment. Furthermore, in some embodiments of the present invention, the magnetic alignment process can be "patterned" such that some regions of the nanotube layer dispensed on a substrate are aligned in one direction, and are aligned in other directions in other regions. These directions can be with magnetic "north" either vertical to the plane (up or down) or in the plane, or any combination of in-plane and out-of-plane (slanted). The alignment process can be carried out either during the carbon nanotube deposition or after deposition.

Figure 2:
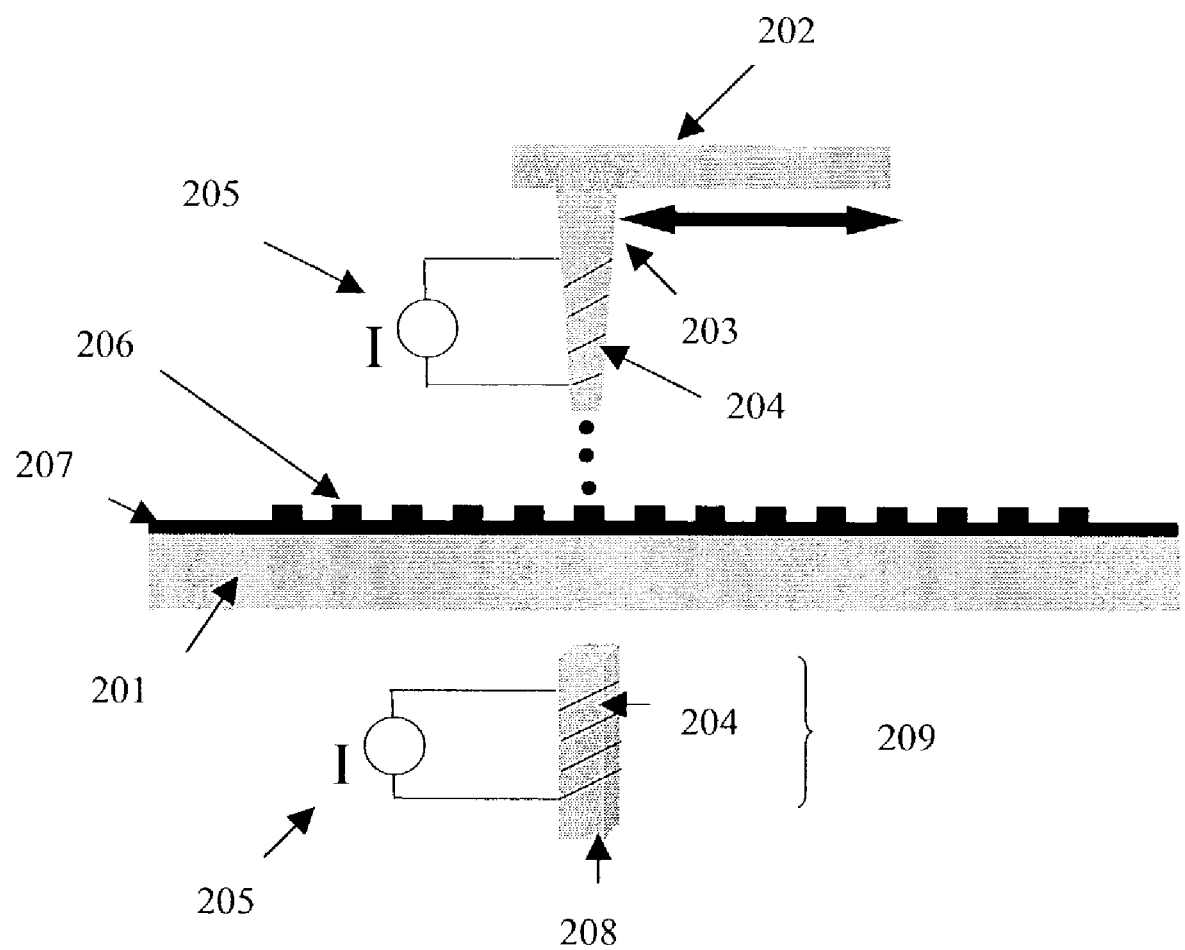
FIG. 2 illustrates an embodiment wherein metallized carbon nanotubes are magnetically-aligned while being dispensed.

FIG. 2 illustrates an embodiment wherein metallized carbon nanotubes are magnetically-aligned while being dispensed. Referring to FIG. 2, a dispensing head 202, which dispenses magnetic, metallized CNTs and which moves in X and/or Y directions, is rastered over substrate 201. As the magnetic, metallized CNTs are forced through nozzle 203, they are aligned with a magnetic field generated by coils 204 and power supply 205. Dispensed drops 206 of magnetically-aligned metallized CNTs can thus be deposited in any arrangement or orientation on a substrate surface. Optionally, an additional magnet 209 comprising a magnetic core 208 can be used to further direct the dispensing process and orient the magnetic, metallized CNTs. In some embodiments, an optional coating 207 is applied to the substrate before commencing with dispensing of the magnetic, metallized CNTs.

In some embodiments, as described later, permanent magnets can be arranged on one or both sides of substrate 201 to assist in aligning magnetically-active metallized CNTs during dispensing. Magnetic fields can also be supplied by larger electromagnetic coils that do not move with the dispensing head.

In some embodiments of the present invention, an electromagnetic head is rastered over a surface, after magnetically-active metallized CNTs have been dispensed onto said substrate. Such rastering produces patterned alignment. In these embodiments, the electromagnetic head writes a pattern into a surface much like a read/write head writes a pattern to a magnetic surface of a disk in a data storage "hard drive" of a computer.

In some embodiments of the present invention, metallic carbon nanotubes are dispensed with nanoparticles in a manner described previously for the dispensing of unmetallized carbon nanotubes with nanoparticles (U.S. Provisional Patent Application, Ser. No. 60/417,246, incorporated herein by reference). Such nanoparticles have compositions which include, but are not limited to, metals, semimetals, fullerenes, semiconductors, dielectrics, ceramics, metalloids, glasses, polymers, and combinations thereof. In some embodiments, the nanoparticles are magnetically active. In some embodiments, magnetically-active metallized carbon nanotubes are dispensed with magnetically-active nanoparticles. In such embodiments, local magnetic field strength can be increased during the alignment process, thus leading to potentially higher degrees of alignment of the metallized carbon nanotubes.

In some embodiments of the present invention, the metallized carbon nanotubes are used for field-emission application. In some embodiments, these metallized carbon nanotubes are more suitable for field emission applications than carbon nanotubes without a metal coating. While not intending to be bound by theory, it is likely that, when incorporated into a device for field emission applications, the metallized carbon nanotubes are better separated from one another, creating a carbon nanotube arrangement of lower density that reduces the shielding effects contributed by neighboring carbon nanotubes. Furthermore, said metal coatings likely enhance the flow of electrons in semiconducting carbon nanotubes and at the nanotube-substrate junction. In some embodiments of the present invention involving field emission applications, the metallized carbon nanotubes are dispensed onto a substrate using an applicator means, and the resulting substrate (with the metallized carbon nanotubes) is used as the cathode in, for example, a field emission display. Other field emission applications in which metallized carbon nanotubes can be used include, but are not limited to, X-ray sources, electron sources, rf arrays, microwave tubes, and combinations thereof.

In some embodiments of the present invention wherein metallized CNTs are dispensed onto a substrate surface for use as a cathode in field emission application, an optional taping process can be used to "activate" the CNT layer and produce better field emission. In such embodiments, an adhesive film or tape is placed on top of the CNT layer such that the adhesive is put in contact with the CNTs. The tape is then removed at an appropriate angle such that the CNTs on the surface of the layer can be vertically aligned to further enhance field emission properties. Such activation has been described previously for field emission cathodes comprising non-metallized CNTs (Chang et al., U.S. Pat. No. 6,436,221 B1; Yaniv et al., U.S. Provisional Patent application Ser. No. 60/348,856; both of which are incorporated herein by reference). Embodiments using magnetic alignment may obviate this step.

Thus, as disclosed herein, the present invention is also directed towards an improved field emission cathode using carbon nanotube emitters that are first coated with a metal film and then dispensed onto the cathode. This field emission cathode is illustrated in FIG. 1. Referring to FIG. 1, metallized carbon nanotubes 106 are shown on a substrate 103 which comprises a conductive layer 102 and an optional layer 101, which can be either conductive or non-conductive. Collectively, this forms field emission cathode 100. This cathode has advantages over the current art in that: a) the metal layer provides a high level of electrical conductivity along the length of the CNT fiber even if the fiber is semiconducting; b) the metal layer provides an additional means of separating the CNT fibers from each other, decreasing the mutual electrical shielding and eliminating the need for post-deposition activation steps; c) metal-coated carbon fibers adhere to metal layers on the substrate much more strongly than do bare carbon nanotubes (adhesion forces between metals are much stronger than the adhesion forces between the substrate and the un-metallized carbon nanotubes); and the metal coatings can be applied to SWNTs and MWNTs, semiconducting or metallic CNTs, purified or non-purified CNTs—all using standard electrolytic techniques permitting selection from a large variety of available CNT fibers. Furthermore, in some embodiments of the present invention, the improved field emission cathode comprises metallized CNTs which can be magnetically-aligned. Magnetic alignment of these metallized carbon nanotubes within the field emission cathode can be in any desired orientation, and can include any or all of the metallized carbon nanotubes. Alignment can be patterned or uniform. Improved field emission from non-metallized carbon nanotube-based field emission cathodes has been realized when the nanotubes are vertically aligned (See U.S. Provisional Patent Application, Ser. No. 60/348,856, incorporated herein by reference).

Figure 3:
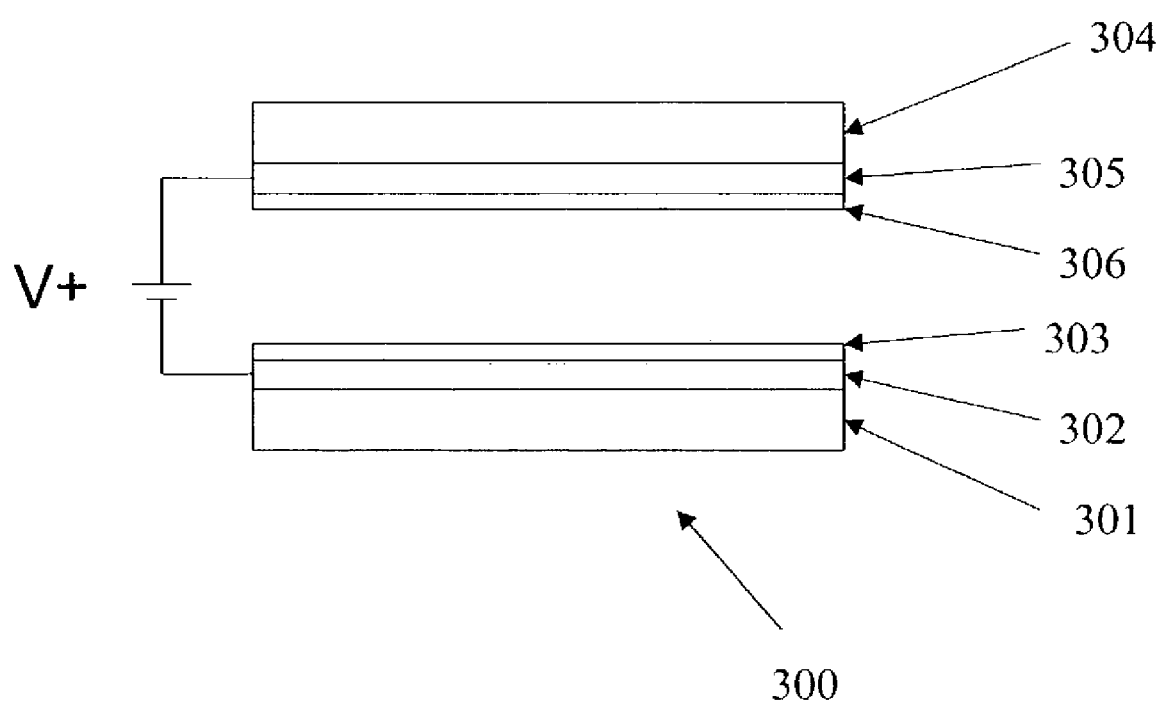
FIG. 3 illustrates a field emission display device incorporating the present invention.

Referring to FIG. 3, the field emission cathode described above can be incorporated into field emission display 300. On substrate 301, conductive layer 302 is deposited and metallized carbon nanotube layer 303 is deposited on top thereof. The anode includes substrate 304, which may be a glass substrate, conductive layer 305, which may be indium-tin-oxide, and a phosphor layer 306 for receiving electrons emitted from metallized carbon nanotube layer 303. Electrons are emitted from layer 303 in response to an appropriate electric field between the anode and the cathode.

In some embodiments of the present invention, carbon nanotubes are coated with a magnetically-active, but non-metallic species. Coated nanotubes such as these can be made by first depositing a metal coating, as described above, and then reacting this coating with other chemicals, such as an oxidant (e.g., oxygen), to form compounds that are no longer metallic, but which are still magnetic. In other embodiments, such non-metallic magnetically-active coatings are chemically precipitated out of a solution onto the carbon nanotubes. An example of a non-metallic magnetically-active material which can be applied to carbon nanotubes as a coating is magnetite ($Fe_3O_4$). Methods of depositing magnetite in this manner are known in the art (Berger et al., "Preparation and Properties of an Aqueous Ferrofluid," *J. Chem. Edu.*, 76(7), 943 (1999); Palacin et al., "Patterning with Magnetic Materials at the Micron Scale," *Chem. Mater.*, 8, 1316 (1996); both of which are incorporated herein by reference). One suitable method of depositing magnetite on carbon nanotubes involves preparing an aqueous solution comprising a mixture of Fe(II) and Fe(III) halides and then reacting this with ammonium hydroxide in the presence of carbon nanotubes. The iron then precipitates out of solution as $Fe_3O_4$, coating the carbon nanotubes in the process. A surfactant may be employed to facilitate dispersion of the carbon nanotubes within this solution.

In other embodiments of the present invention, other types of nanostructured materials can be used in place of carbon nanotubes. These other nanostructured materials can be metallized, dispensed on a substrate, and, if metallized with a magnetically-active metal, they can be aligned—all in the same manner in which the metallized carbon nanotubes are. Such nanostructures materials include, but are not limited to, boron nitride nanotubes, and nanowires of silicon, silicon carbide, gallium nitride, indium phosphide, and combinations thereof.

The process, according to the present invention, of first coating CNTs with metal and then dispensing them onto a substrate has a number of advantages, particularly for filed emission applications. Such a method of dispensing CNTs onto a substrate serves to inhibit clumping, provides for sufficiently good contact to the substrate, overcomes the limitations imposed by semiconducting CNTs, and it obviates the need for activation processes. Yet another advantage, in embodiments where the metal coating is magnetically active, is the ability to align the metal coated CNTs before, during, or after deposition.

The following examples are provided to more fully illustrate some of the embodiments of the present invention. The examples illustrate methods by which metal-coated (metallized) CNTs can be made and prepared for field emission applications. It should be appreciated by those of skill in the art that the techniques disclosed in the examples which follow represent techniques discovered by the inventor to function well in the practice of the invention, and thus can be considered to constitute exemplary modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

Coating Single-Wall Carbon Nanotubes with a Cobalt Thin Film

This process provides a way of depositing a metal thin film or coating on the surface of carbon nanotubes using an electroless plating technique. Using this relatively inexpensive and simple process, metallized carbon nanotubes can be made efficiently in relatively large amounts.

The single-wall carbon nanotube (SWNT) material used here was purchased from Iljin Nanotech, Inc. (Korea). The length of the SWNTs ranged from approximately several micrometers to approximately 20 micrometers, and the diameters were generally less than about 2 nanometers.

Figure 4:
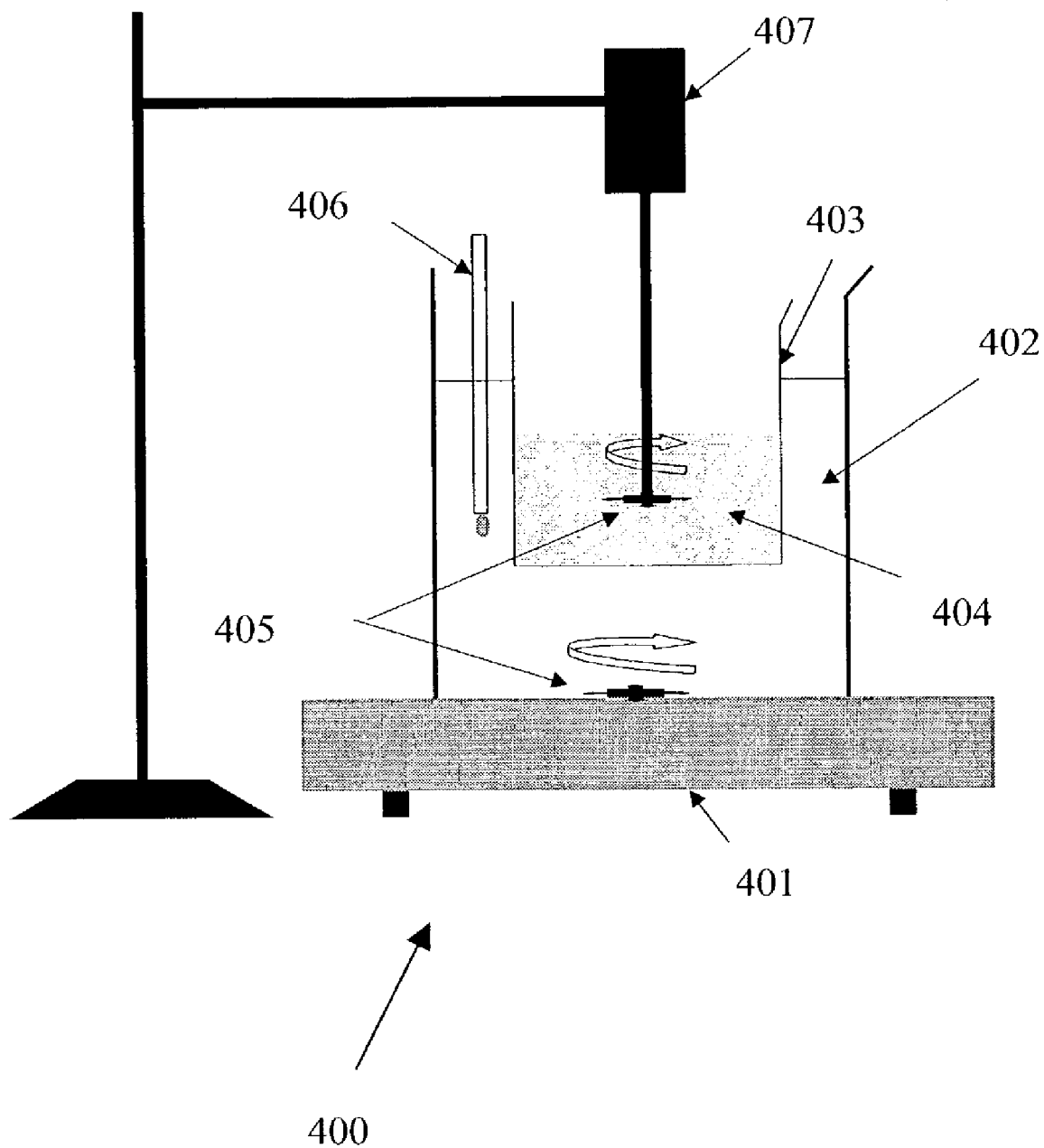
FIG. 4 illustrates an electroless plating bath used to coat carbon nanotubes with metal.

Referring to FIG. 4, electroless plating apparatus 400 comprises an electroless plating solution 404 contained in a beaker 403 which in turn is immersed in a water bath 402. Water bath 402 is heated by a magnetic stirring hotplate 401 and temperature is monitored by thermometer 406. Stirring is accomplished with stir bars 405 activated by the magnetic stirring hotplate 401 and the stirring motor 407. In the present example, electroless plating solution 404 comprises water and the following chemicals:

1. A cobalt (Co) salt ($CoSO_4 \cdot 7H_2O$) to provide Co ions (Note that other salts may be used, e.g., $CoCl_2 \cdot 6H_2O$). Concentration of this component is approximately 20–28 grams per liter.
2. A reducing agent ($NaH_2PO_2 \cdot H_2O$) to reduce Co ions to Co(0). Concentration of this component is approximately 18–25 grams per liter.
3. A promoter species to facilitate dissolution of the Co salt into the solution ($C_4H_4O_6KNa \cdot 4H_2O$). Concentration of this component is approximately 140–160 grams per liter.
4. A stabilizing agent ($H_3BO_3$), to slow the reducing reaction. Concentration of this component is 27–35 grams per liter.
5. A balancing agent (NaOH). This is used to control the pH value of the solution. The amount of this material that is used is that needed to maintain a pH of 8–10 for the metal plating solution.

The above chemicals were dissolved in deionized water up to 900 milliliters.

The cobalt ions in this solution undergo reduction under a reducing condition of approximately 85–95° C. The pH of the solution needs to be controlled before and during the reaction. In this example, the pH value was maintained at about 9. NaOH was added during the plating process to control the pH of the solution.

Approximately 3–4 grams of carbon nanotube powder is ultrasonicated in a beaker containing approximately 100 milliliters of water for several minutes before being introduced into the electroless plating solution (after addition, total solution is 1000 milliliters). After the solution is prepared, it is heated in a water bath to 85–95° C. and the ultrasonicated SWNTs are then added to the electroless plating solution quickly while the solution was stirred. Because the carbon nanotubes easily clump together, the water+CNT mixture should be ultrasonicated immediately before adding it to the plating solution. The typical reaction time in the plating solution is about 5–10 minutes. Longer times do not appear to affect the results greatly. During the reaction, gas is evolved from the solution. The solution is pink at the beginning but gradually turns colorless. At the end of the reaction, little or no gas is evolved from the solution.

After reaction/deposition of metal, the reaction beaker is taken out of the water bath and allowed to cool down to room temperature. After several minutes, the metallized carbon nanotube powders collect at the bottom of the beaker and the solution is decanted from the powder. The powder is washed several times, each time being careful to not disturb the powder. Washing dilutes the concentration of any electroless plating reactants still remaining on the powder after the reaction. The powder is then removed and dried in a furnace at about 60° C.–100° C. for several hours. The carbon nanotube powder is now coated with a thin layer or film of metal.

Example 2

Dispensing Carbon Nanotubes onto a Substrate

In this example, cobalt-metallized SWNT powder was mixed with isopropyl alcohol (IPA) to form a suspension. The suspension comprised approximately 1 gram of metallized SWNTs in 1000 ml EPA. Because the SWNTs clump together readily, ultrasonic agitation was used to disperse the nanotubes in the IPA before spraying the solution onto cathode substrates. The SWNT/IPA suspension was sprayed onto conductive indium-tin-oxide (ITO)/glass substrate with an area of 2×2 $cm^2$. In order to prevent the IPA from flowing uncontrollably, the substrate was heated up to approximately 30–70° C. on both the front side and back side during the spraying process. The substrate was sprayed back and forth several to tens of times until the carbon nanotubes covered on the entire surface. The thickness of the carbon nanotube layer was about 1–20 $\mu$m. The film was then dried in air.

3. Field Emission Test of the Samples

Figure 5:
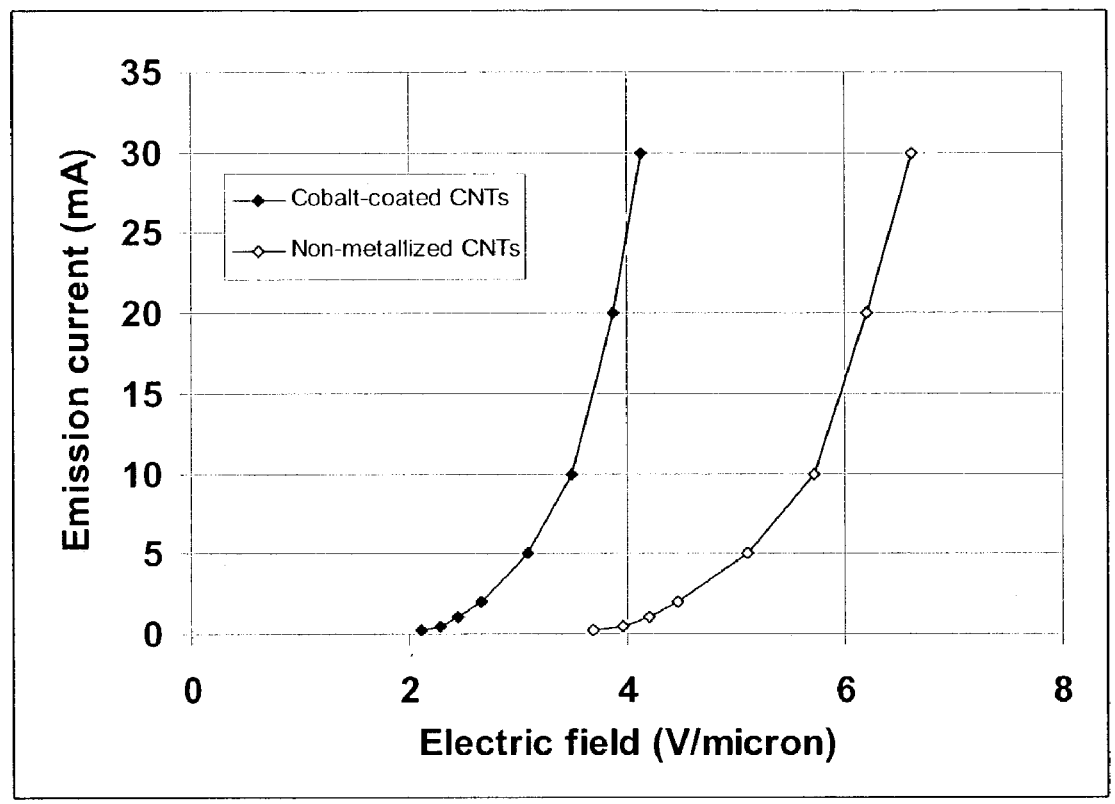
FIG. 5 illustrates field emission current vs. electric field for cobalt-coated and non-coated carbon nanotubes.

Substrates with metallized SWNT material coated on them were prepared as cathodes and tested for field emission properties as illustrated in FIGS. 1 and 3. Non-metallized SWNT coated substrates were also prepared in an identical fashion by the spray process for comparison purposes. The cathodes were tested by mounting them with a phosphor screen in a diode configuration with a gap of about 0.5 mm. The test assembly was placed in a vacuum chamber and pumped to $10^{-7}$ torr. The electrical properties of the cathodes were then measured by applying a negative, pulsed voltage to the cathode and holding the anode at ground potential and measuring the current at the anode. A pulsed voltage was used to prevent damage to the phosphor screen at the high current levels (duty factor: 2%). FIG. 5 illustrates the results of these tests. In each case, the cathodes were not "activated," they were tested as they were deposited. It was found that the metallized CNT cathodes were very stable and very uniform. The non-metallized cathodes typically were unstable during the turn-on process (several arcing events occurred). From FIG. 5 it can be seen that metallized SWNTs yield much better field emission properties than the non-metallized SWNTs. Tests on the cathodes show threshold extraction fields of about 2 V/$\mu$m and emission current of 30 mA at 4 V/$\mu$m for Co-coated CNT compared with extraction fields of 3.5 V/$\mu$m and emission current of 30 mA at 6.5 V/$\mu$m for non-metallized CNTs.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the methods described herein without departing from the concept, spirit, and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope, and concept of the invention as defined by the appended claims.

4. Dispensing and Alignment of Magnetically-Active Metallized Carbon Nanotubes

Figure 6:
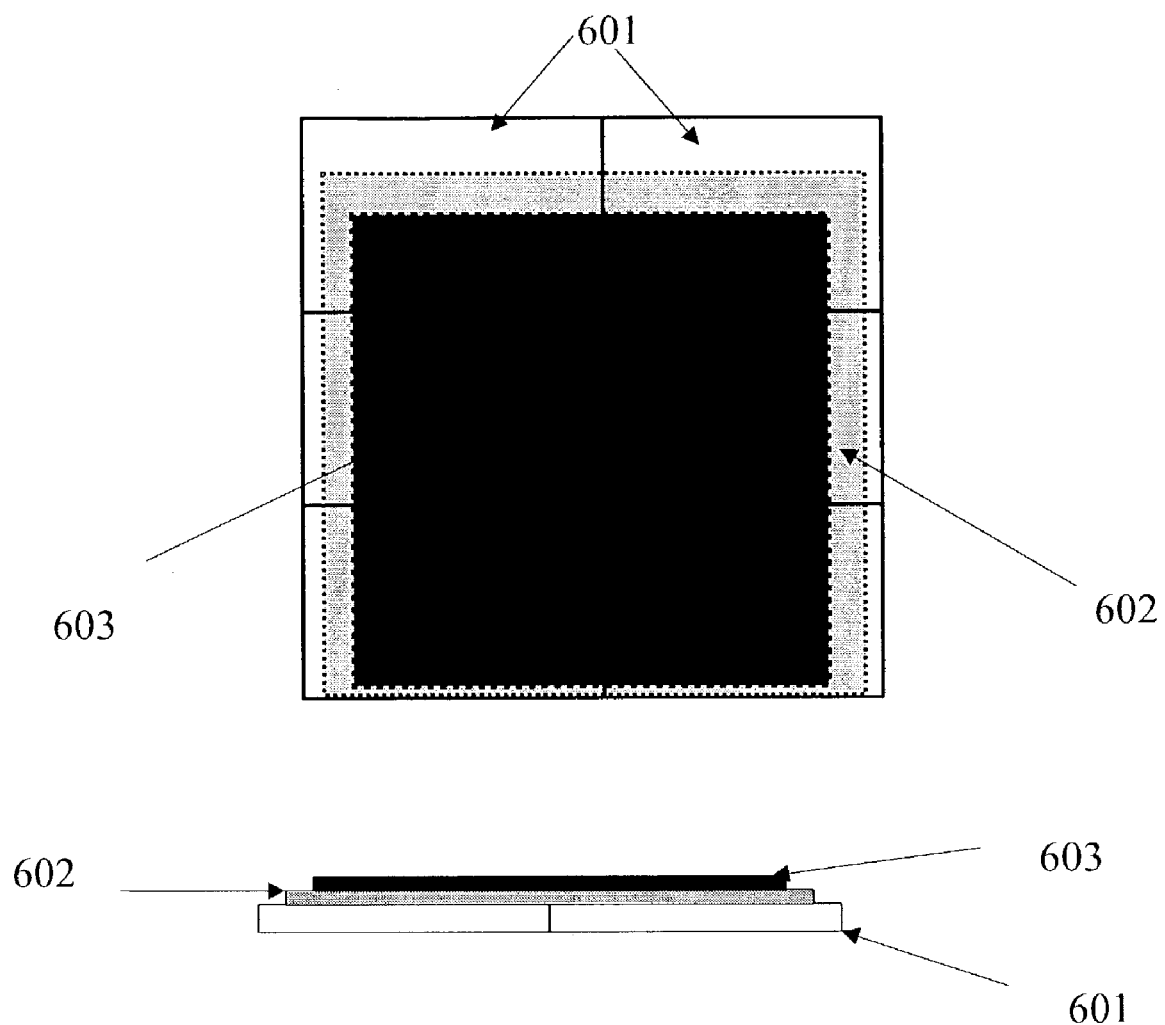
FIG. 6 illustrates an embodiment wherein a cathode substrate was placed on a set of six permanent magnets prior to dispensing magnetically-aligned metallized CNTs onto the substrate.

Cobalt-coated SWNTs were made according to the technique outlined in EXAMPLE 1. Referring to FIG. 6, a 25 cm×25 cm cathode substrate 602 comprising ITO/glass was placed on top of six adjacent 10 cm×15 cm permanent magnets 601 as shown in FIG. 6. The magnetically-active metallized SWNTs were then spayed into the cathode substrate to form a CNT layer 603 in accordance with the technique outlined in EXAMPLE 2.

Figure 7:
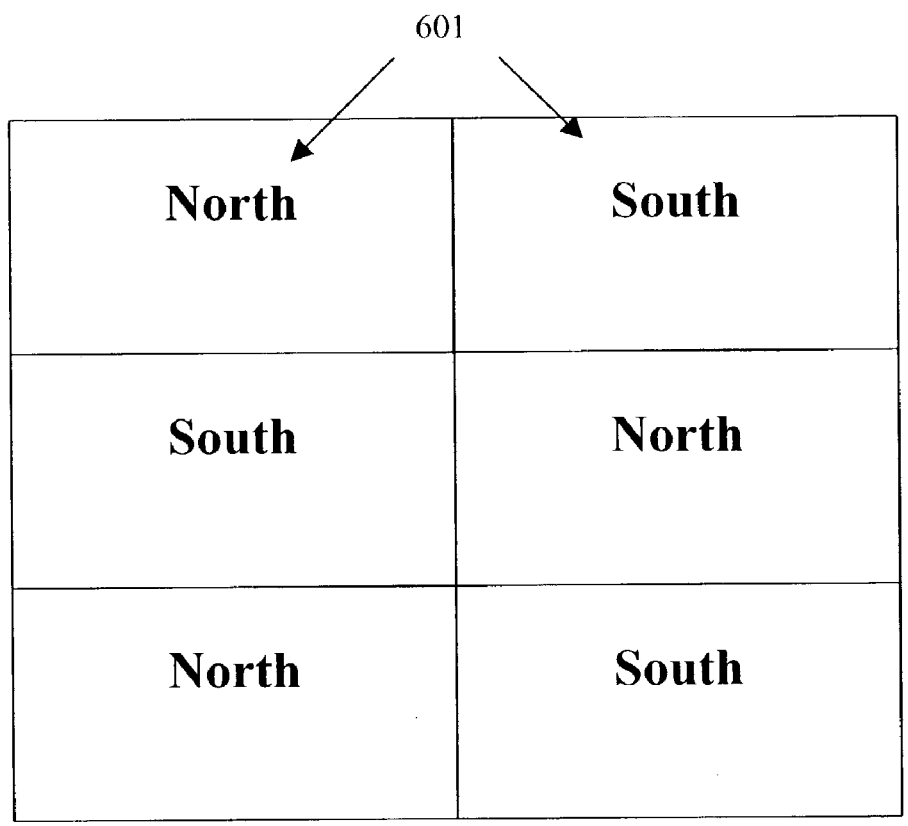
FIG. 7 illustrates the arrangement of the six permanent magnets in FIG. 6 prior to placing the ITO/glass substrate and dispensing the magnetically-aligned CNTs onto the substrate wherein the face of each of the block magnets is magnetized North-South as shown in the edge (side) view.
Figure 7:
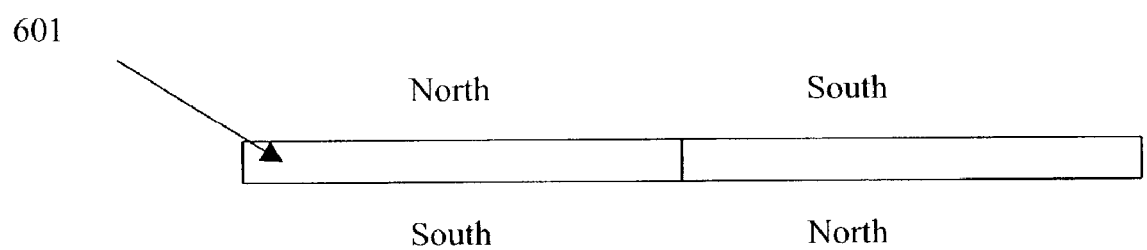

In some embodiments, a masking layer can be placed on the surface of the substrate to pattern the CNT layer during the spraying process. In some embodiments, this mask layer is a metal foil with holes that allow the CNTs to collect on the substrate in a defined pattern. In some embodiments, the metal foil is also magnetic and is attracted to the magnets 601 on the other side of the substrate to hold the foil firmly to the cathode substrate 602. In some embodiments, the magnets 601 can have permanent magnetic poles on the ends or sides or faces of the magnet. In this example, the poles were on the faces of the magnet as shown in FIG. 7. The arrangement of the magnets are also shown in FIG. 7. Still referring to FIG. 7, other arrangements are possible, including a complete reversal of north to south and south to north. In some embodiments the substrate 602 itself is magnetically-active and in such embodiments magnets 601 may not be needed.

Figure 8:
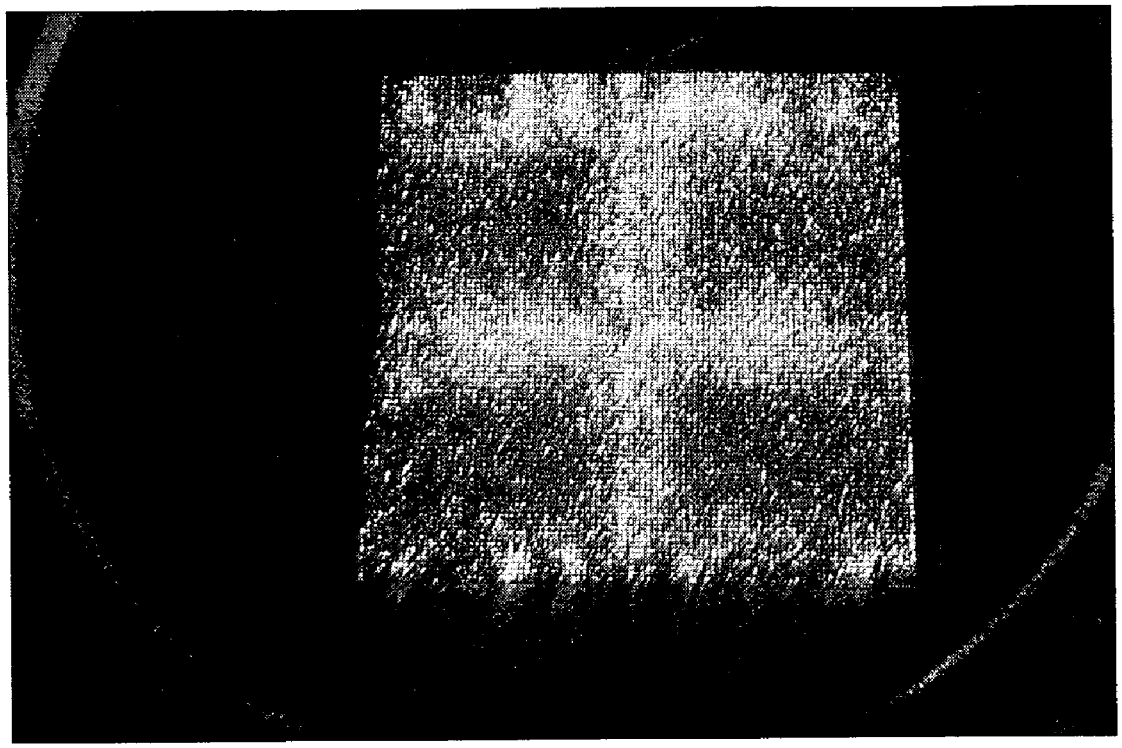
FIG. 8 illustrates field emission in a display device wherein the cathode comprises magnetically-active metallized CNTs which were dispensed onto a substrate with magnets behind it, as in FIG. 7.

In the current example, after spraying the magnetically-active metallized SWNTs onto the cathode substrate, the magnets are removed and the cathode incorporated into a field emission display device, as in FIG. 3. FIG. 8 illustrates this device in use. FIG. 8 shows an image of a field emission display device which depicts field emission intensity (bright spots) on a phosphor screen. It is interesting to note that the regions of highest intensity are those where there were adjoining magnets on the backside (See FIGS. 6 & 7).

What is claimed is:

1. An apparatus comprising:
   a) a substrate;
   b) magnetically-active metallized carbon nanotubes supported exclusively by the substrate; and
   c) nanoparticles;
   wherein the apparatus is operable for use as a cathode in field emission devices.

2. The apparatus of claim 1, wherein at least some of the nanoparticles are magnetically active.

3. A method comprising the steps of:
   a) providing a substrate; and
   b) dispensing a liquid suspension of magnetically-active metallized carbon nanotubes in a solvent onto said substrate using an applicator means and;

c) removing the solvent to yield an apparatus comprising magnetically-active metallized carbon nanotubes supported exclusively by the substrate, wherein the apparatus is operable for use as a cathode in field emission devices.

4. The method of claim 3, wherein the applicator means comprises a spraying technique.

5. The method of claim 3, wherein the magnetically-active metallized carbon nanotubes are dispensed onto said substrate with carbon nanotubes that are not magnetically active.

6. The method of claim 3, wherein the magnetically-active metallized carbon nanotubes are dispensed onto said substrate with nanoparticles.

7. The method of claim 6, wherein at least some of the nanoparticles are magnetically active.

8. The method of claim 3, wherein the magnetically-active metallized carbon nanotubes are aligned with a magnetic field while they are being dispensed.

9. The method of claim 3, wherein the substrate is magnetically-active.

10. The method of claim 3, wherein the magnetically-active metallized carbon nanotubes are aligned with a magnetic field subsequent to being dispensed.

11. The method of claim 10, wherein the magnetically-active metallized carbon nanotubes are aligned with a taping process.

12. The method of claim 10, wherein the magnetically-active metallized carbon nanotubes undergo patterned alignment using an electromagnetic head that is rastered over the substrate on which they are dispensed.

13. A field emission display device comprising:
a) an anode assembly; and
b) a cathode assembly, wherein the cathode assembly comprises:
1) a substrate;
2) an electrically conducting layer deposited on the substrate; and
3) a layer of magnetically-active metallized carbon nanotubes deposited over the electrically conducting layer, wherein the CNTs are supported exclusively by the substrate and the electrically conducting layer thereon.

* * * * *